United States Patent Office 3,386,024
Patented May 28, 1968

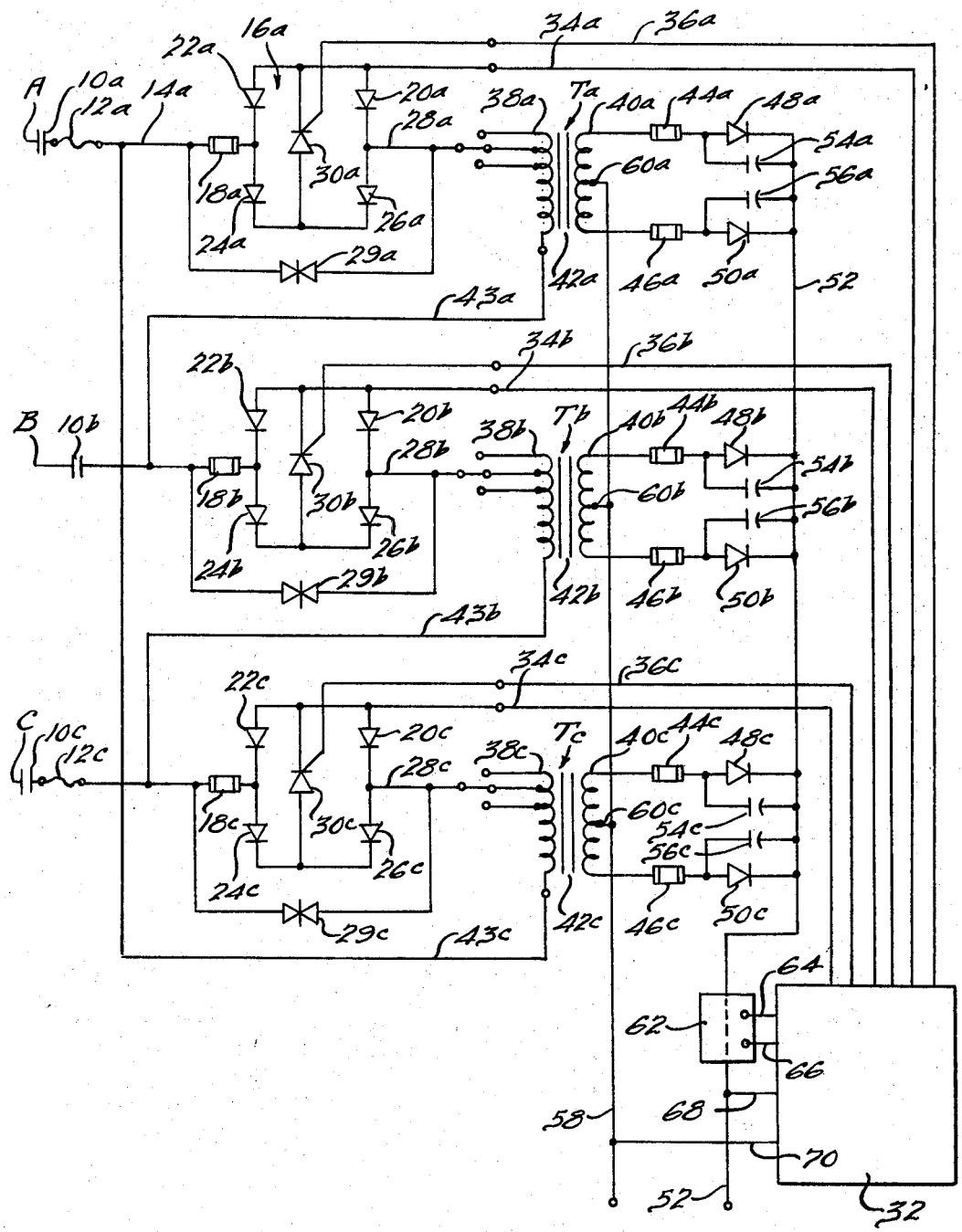

3,386,024
APPARATUS FOR PROVIDING A DIRECT POTENTIAL OUTPUT FROM A MULTIPHASE ALTERNATING POTENTIAL INPUT
Michael A. Koltuniak, Warren, and Charles E. Fenoglio, Detroit, Mich., assignors to The Udylite Corporation, Warren, Mich., a corporation of Delaware
Filed Jan. 15, 1965, Ser. No. 425,906
1 Claim. (Cl. 321—5)

ABSTRACT OF THE DISCLOSURE

Multiphase rectifying apparatus with a control circuit for each phase and with electrical magnetic isolation to prevent undesirable coupling effects to the control circuit.

This invention relates to apparatus for providing a direct potential output from a multiphase alternating potential input, and more particularly to an improvement in apparatus for controllably providing such an output.

Each phase of a multiphase alternating potential can be rectified by means including a bridge circuit having a controllable electron flow device such as a thyratron or an SCR for controlling the amplitude of the direct voltage output of that phase. With such flow devices, the amplitude of the direct voltage can be controlled via a control potential applied to the circuit of the device. The output from each bridge circuit for each phase can then be transformer coupled to rectifying apparatus having a common output circuit; it is common practice to mount the windings of the individual transformers upon a common core. It has been found, however, that inductive and other coupling effects between adjacent windings can be such as to interfere with the control of the amplitude of the output potential by the devices for the different phases. Note that with such apparatus these undesirable coupling effects would also be a function of the load current and hence the control by the devices would be effected by changes in the load. In the present invention the inductive and other coupling effects are eliminated and hence effective control can be provided by each of the devices; therefore, it is a general object of this invention to provide improved apparatus for providing a controlled direct potential output from an alternating potential multiphase source.

It is another object of the present invention to provide apparatus for providing a direct potential output of a preselected amplitude from an alternating potential multiphase source by means of a control circuit for each phase which is transformer coupled to an output circuit and in which the influence upon the different control circuits by inductive and other coupling effects between the transformers of the different phases is minimized or substantially eliminated.

In the present invention, a three-phase delta system is provided and a control circuit is included in each leg of the delta; if a Y system were attempted, then the control circuits could be included in the legs only if a fourth, center conductor were utilized; therefore, it is another object of the present invention to provide apparatus for providing a direct potential output of a preselected amplitude from a three-phase source in which a delta system is utilized having a control circuit in each leg.

Other objects, features, and advantages of the present invention will become apparent from the subsequent description and the appended claims, taken in conjunction with the accompanying drawings, in which:

The drawing is an electrical schematic diagram of a preferred form of the present invention.

Looking now to the drawing, the apparatus is shown for use with a three-phase system having inputs A, B and C for the three phases, AB, BC and CA. Since the apparatus for each of the three phases is substantially identical, the apparatus for phase AB only will be described, and similar components associated with phases BC and CA serving similar functions will be given the same numeral designation with the addition of the letter subscripts b, c, respectively.

Looking now to phase AB, the input at A is provided with normally closed contacts 10a of a relay which contacts are serially connected to a thermal overload sensing element 12a and via a conductor 14a and fuse 18a to a bridge type control circuit 16a. Only two thermal sensing elements 12a and 12c are required and they function in a conventional manner to open the contacts 10a, 10b and 10c in the event of a current overload. The control circuit 16a includes four diodes 20a, 22a, 24a and 26a, with diode 22a having its cathode connected to the anode of diode 24a, with the cathode of diode 20a being connected to the anode of 26a, with the anodes of diodes 20a and 22a connected together, and with the cathodes of diodes 24a and 26a connected together. The fuse 18a is connected at the juncture between diodes 22a and 24a and provides an input to the control circuit 16a, while a conductor 28a is connected at the juncture of diodes 20a and 26a to provide an output therefrom.

An SCR 30a has its anode connected to the juncture between diodes 24a and 26a and has its cathode connected to the juncture between diodes 20a and 22a. An examination of the bridge circuit 16a will show that pulses of current of one polarity will be conducted to the conductor 28a via a path including the diode 24a, the principal electrodes of the SCR 30a and the diode 20a, and that pulses of current of the opposite polarity will be conducted to the output conductor 28a via the diode 22a, the principal electrodes of SCR 30a and the diode 26a. The result is a pulsating alternating potential output, with the average amplitude of the pulses being controlled by the conduction time of the SCR 30a.

The control circuit 16a is shunted by a pair of back-to-back Zener type diodes 29a which acts as a transient voltage suppressor whereby high voltage transients which could damage the elements of the control circuit 16a will be shunted therearound.

The conduction time of the SCR 30a is controlled in a conventional manner by a pulse applied between the gate and cathode electrodes. The occurrence of the firing pulse is controlled by a firing circuit generally indicated by the numeral 32. The firing circuit 32 can be of a conventional construction well known in the art, and since the specific details thereof in no way constitute a part of the present invention, the details have been omitted for the purpose of simplicity. Firing circuit 32 has an output circuit connected across the cathode and gate of the SCR 30a via conductors 34a and 36a, respectively.

The output conductor 28a is connected to one end of a primary winding 38a of transformer Ta having a secondary winding 40a and a magnetic core 42a. The opposite end of primary winding 38a of the transformer Ta is connected to the input B via a conductor 43a. A plurality of taps are provided at the input of the primary 38a whereby more or less turns can be connected to the output conductor 28a hence permitting for an adjustment in the ratio between primary and secondary windings whereby different voltage conditions can be accommodated.

At this point it should be noted that the cores 42a, 42b and 42c are separate from each other. It can be appreciated from the prior discussion that the input to the primary winding 28a through the control circuit 16a and conductors 28a and 43a will be an alternating potential of portions of the successive half waves which will have substantially fast rising wave fronts. If the windings of transformers Ta, Tb and Tc were all mounted on a common magnetic core, as phase AB conducted through SCR 30a and primary 38a, a voltage would be induced in the primaries 38b and 38c. Because of the fast rising wave front, this voltage could reach a sufficient magnitude to break down the SCR's 30b and 30c and cause premature firing. The result would be conduction of SCR's 30a–30c for substantially most of the periods of the successive half cycles and a generally complete loss of control by the control circuits 16a, 16b and 16c. By providing for separate cores 42a, 42b and 42c, this inductive coupling effect is eliminated and control can be effectively maintained.

Transformer Ta has a secondary winding 40a with one side connected to a fuse 44a and the other to a fuse 46a. Fuse 44a is in turn serially connected to the anode of a diode 48a with the fuse 46a being serially connected to the anode of a diode 50a; the cathodes of the diodes 48a and 50a are connected together to an output conductor 52. A second output conductor 58 is serially connected to a center tap 60a of secondary winding 40a of the transformer Ta. With the above circuit arrangement, a direct current potential output is provided between the conductors 52 and 58. The diodes 48a and 50a are shunted by capacitors 54a and 56a to provide a filtering action to reduce the ripple of the direct potential output.

The output current to conductors 52 and 58 can be sensed by a transductor 62, which is connected with the output conductor 52. The transductor 62 can be of a conventional construction and since the details thereof in no way constitute a part of the present invention, these details have been eliminated for the purposes of simplicity. The transductor 62 provides an output signal which is fed to the input of a firing circuit 32 via conductors 64 and 66. The amplitude of the potential across the output conductors 52 and 58 is sensed and fed into the firing circuit 32 via conductors 68 and 70. Thus the firing circuit 32 can be set to be operative responsively to output voltage, output current, or both; by controlling the time of occurrence of the firing pulses to conductors 34a and 36a as applied to the SCR 30a, its firing point can be controlled resulting in conduction over more or less of the periods of the successive half cycles. It can be seen that by similarly controlling SCR's 30b and 30c the amplitude of the current and/or voltage output at conductors 52 and 58 can be controlled. In this regard, by separating the cores 42a, 42b and 42c and eliminating the inductive coupling effects between transformers 10a, 10b and 10c, loss of control by the SCR's 30a, 30b and 30c is eliminated and hence effective control is maintained by the control circuit 16a, 16b and 16c over the desired operating range.

Upon examination of the circuitry, it can be noted that the transformers Ta, Tb and Tc are connected in the form of a delta winding with the control circuit 16a, 16b and 16c being included in different ones of the three legs thereof. It can be appreciated that if a Y type three-phase connection were attempted with a three-wire system, it would be impossible to locate the above control circuits within each of the legs since in a three-wire Y system there would be common current flow from the different phases through the different legs.

While it will be apparent that the preferred embodiment of the invention disclosed is well calculated to fulfill the objects above stated, it will be appreciated that the invention is susceptible to modification, variation and change without departing from the proper scope or fair meaning of the subjoined claim.

What is claimed is:

1. Apparatus for providing a direct potential output from an alternating potential three-phase source comprising: circuit breaker means connected to each phase of the source, current sensing means operatively connected to said breaker means for opening said breaker means in response to excessive current, rectifying means for each phase of the source for providing a direct potential output from the alternating potential input of that phase with which it is associated, said rectifying means including a transformer having primary and secondary windings, control means selectively controllable for transmitting to said primary selected portions of successive half cycles of alternate polarity of that phase with which it is associated, fuse means electrically connected to said control means for protecting said control means from excessive current, suppressor means connected across said control means for shunting high transient voltages from said control means, said control means including an SCR having anode, cathode and gate electrodes with the anode and cathode being connected to said primary of said transformer, a first pair of diodes being serially connected and having the anode of one connected to the cathode of said SCR and the cathode of the other connected to the anode of said SCR, a second pair of diodes connected identically as said first pair of diodes, an input conductor connected from the source to the juncture of said first pair of diodes, and an output conductor connected from the juncture of said second pair of diodes to one side of said primary, and means including said input and output conductors connecting each said primary and each said control means together into a three-phase delta network, and means electrically connected to said secondary for rectifying the alternating potential thereof, said last named means including a first diode having a first electrode of one polarity connected to one side of said secondary and a second diode having a first electrode of the same polarity as the first electrode of said first diode similarly connected to the other side of said secondary, said first diode and said second diode each having a second electrode of polarity opposite to that of the first electrode, circuit means electrically connecting the second electrodes of said first diode and said second diode together, fuse means serially connected to said first diode and said second diode for protecting said first and second diode from excessive current, output means commonly connected to a center tap of each said transformer and to the juncture of each said first and second diodes whereby each said secondary is substantially electrically isolated from the others from current flow of one polarity relative to said center tap, and means for substantially magnetically isolating the windings of each said transformer from each other.

References Cited

UNITED STATES PATENTS

| | | | |
|---|---|---|---|
| 3,143,698 | 8/1964 | Rockafellow | 323—18 |
| 3,146,392 | 8/1964 | Sylvan | 323—22 |
| 3,197,691 | 7/1965 | Gilbert | 321—18 |
| 3,309,599 | 3/1967 | Broomhall | 321—24 |

JOHN F. COUCH, *Primary Examiner.*

WARREN E. RAY, *Examiner.*

W. H. BEHA, Jr., *Assistant Examiner.*